(12) United States Patent
Chou et al.

(10) Patent No.: US 8,774,811 B2
(45) Date of Patent: Jul. 8, 2014

(54) METHOD FOR SELECTING OPTIMAL RADIO ACCESS TECHNOLOGY AND COMMUNICATION APPARATUSES UTILIZING THE SAME

(75) Inventors: Shuang-An Chou, Keelung (TW); Hsiao-Ju Kuo, Taipei (TW); Shih-Hsin Chien, Banciao (TW)

(73) Assignee: MediaTek Inc., Hsin-Chu (TW)

( * ) Notice: Subject to any disclaimer, the term of this patent is extended or adjusted under 35 U.S.C. 154(b) by 214 days.

(21) Appl. No.: 13/163,135

(22) Filed: Jun. 17, 2011

(65) Prior Publication Data

US 2012/0322504 A1    Dec. 20, 2012

(51) Int. Cl.
*H04W 4/00*    (2009.01)
*H04M 1/00*    (2006.01)
*H04B 1/38*    (2006.01)

(52) U.S. Cl.
USPC ............... 455/437; 455/552.1; 455/558

(58) Field of Classification Search
CPC ..... H04W 36/30; H04W 36/14; H04W 88/06; H04W 36/22; H04W 36/0094
USPC ........ 455/435.1–435.3, 436–444, 552.1, 558; 370/331–332
See application file for complete search history.

(56) References Cited

U.S. PATENT DOCUMENTS

| | | | |
|---|---|---|---|
| 8,121,633 B2 * | 2/2012 | Cormier et al. | 455/525 |
| 8,320,909 B2 * | 11/2012 | Ramasamy et al. | 455/434 |
| 2008/0176565 A1 * | 7/2008 | Eerolainen et al. | 455/436 |
| 2008/0254802 A1 | 10/2008 | Ohta et al. | |
| 2011/0012987 A1 * | 1/2011 | Yoon | 348/14.02 |
| 2011/0021195 A1 | 1/2011 | Cormier et al. | |

FOREIGN PATENT DOCUMENTS

EP    1 947 883    7/2008
WO    WO 2011013678 A1 *    2/2011

\* cited by examiner

*Primary Examiner* — George Eng
*Assistant Examiner* — Nam Huynh
(74) *Attorney, Agent, or Firm* — McClure, Qualey & Rodack, LLP

(57) ABSTRACT

A communication apparatus is provided. A first subscriber identity card camps on a first cell, which is associated with a first radio access technology (RAT) and belongs to a first wireless network, via a radio transceiver module. A second subscriber identity card camps on a second cell, which is associated with a second RAT and belongs to a second wireless network, via the radio transceiver module. A processor constructs a first packet switch connection with the first wireless network via the first subscriber identity card to perform data transfer in the first wireless network, measures a first data transfer throughput of the first wireless network when performing the data transfer via the first subscriber identity card, and determines to perform the data transfer in the second wireless network via the second subscriber identity card when a theoretical data transfer throughput corresponding to the second RAT is higher than the first data transfer throughput.

21 Claims, 9 Drawing Sheets

| RAT | Theoretical Downlink Throughput |
|---|---|
| 2G/2.5G | 9.05kbps |
| 3G/3.5G | 15 kbps |
| 4G | 30.9 kbps |

FIG. 4a

| RAT | Experimental Downlink Throughput |
|---|---|
| 2G/2.5G | E_Throughput 1 |
| 3G/3.5G | E_Throughput 2 |
| 4G | E_Throughput 3 |

FIG. 4b

| RAT | Observed Downlink Throughput |
|---|---|
| 2G/2.5G | O_Throughput 1 |
| 3G/3.5G | O_Throughput 2 |
| 4G | O_Throughput 3 |

FIG. 4c

| RAT | Expected Downlink Throughput |
|---|---|
| 2G/2.5G | (Max2.5G+Min2.5G)/2 |
| 3G/3.5G | (Max3.5G+Min3.5G)/2 |
| 4G | (Max4G+Min4G)/2 |

FIG. 4d

METHOD FOR SELECTING OPTIMAL RADIO ACCESS TECHNOLOGY AND COMMUNICATION APPARATUSES UTILIZING THE SAME

BACKGROUND OF THE INVENTION

1. Field of the Invention

The invention relates to an intelligent subscriber identity card selection method, and more particularly to an intelligent subscriber identity card selection method for automatically determining a subscriber identity card having an optimal radio access technology (RAT) to provide optimal communications services.

2. Description of the Related Art

The term "wireless", normally refers to an electrical or electronic operation, which is accomplished without the use of a "hard wired" connection. "Wireless communications", is the transfer of information over a distance without the use of electrical conductors or wires. The distances involved may be short (a few meters for television remote controls) or very long (thousands or even millions of kilometers for radio communications). The best known example of wireless communications is the cellular telephone. Cellular telephones use radio waves to enable an operator to make phone calls to another party, from many locations world-wide. They can be used anywhere, as long as there is a cellular telephone site to house equipment that can transmit and receive signals, which are processed to transfer both voice and data to and from the cellular telephones.

There are various well-developed and well-defined cellular communications technologies. For example, the Global System for Mobile communications (GSM) is a well-defined and commonly adopted communications system, which uses time division multiple access (TDMA) technology, which is a multiplex access scheme for digital radio, to send voice, data, and signaling data (such as a dialed telephone number) between mobile phones and cell sites. Furthermore, the GSM also uses frequency division multiple access (FDMA) technology. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the 2G GSM system. The Wireless Fidelity (Wi-Fi) is a technology defined by the 802.11b engineering standard and can be used for home networks, mobile phones, and video games, to provide a high-frequency wireless local area network.

With the advanced development of wireless communications technologies, it is now possible to provide multiple wireless communications services using different or the same communications technologies in one mobile station (MS). In order to provide an optimal communications services, an intelligent subscriber identity card selection method requests are provided.

BRIEF SUMMARY OF THE INVENTION

Communication apparatuses and methods for selecting a subscriber identity card of a communications apparatus having an optimal radio access technology (RAT) are provided. An embodiment of a communication apparatus comprises a radio transceiver module, a first subscriber identity card, a second subscriber identity card, a memory device and a processor. The first subscriber identity card camps on a first cell, which is associated with a first RAT and belongs to a first wireless network, via the radio transceiver module. The second subscriber identity card camps on a second cell, which is associated with a second RAT and belongs to a second wireless network, via the radio transceiver module. The memory device stores a plurality of theoretical data transfer throughputs corresponding to different RATs. The processor is coupled to the first subscriber identity card, the second subscriber identity card, the memory device and the radio transceiver module. The processor constructs a first packet switch connection with the first wireless network via the first subscriber identity card to perform data transfer in the first wireless network, measures a first data transfer throughput of the first wireless network when performing the data transfer via the first subscriber identity card, obtains a theoretical data transfer throughput corresponding to the second RAT from the memory device, and determines to perform the data transfer in the second wireless network via the second subscriber identity card when the theoretical data transfer throughput corresponding to the second RAT is higher than the first data transfer throughput.

Another embodiment of a method for selecting a subscriber identity card of a communications apparatus having an optimal RAT to perform data transfer, comprises: obtaining a first theoretical data transfer throughput corresponding to a first RAT and a second theoretical data transfer throughput corresponding to a second RAT, wherein a first subscriber identity card is equipped in the communications apparatus and camps on a first cell, which is associated with the first RAT and belongs to a first wireless network, and a second subscriber identity card is equipped in the communications apparatus and camps on a second cell, which is associated with the second RAT and belongs to a second wireless network and a radio transceiver module; constructing a first packet switch connection with the first wireless network via the first subscriber identity card to perform data transfer when the first theoretical data transfer throughput is higher than the second theoretical data transfer throughput; and performing the data transfer in the first wireless network via the first subscriber identity card.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 4a shows exemplary theoretical data transfer throughputs of different RATs stored in the memory device according to an embodiment of the invention;

FIG. 4b shows exemplary theoretical data transfer throughputs of different RATs stored in the memory device according to another embodiment of the invention;

FIG. 4c shows exemplary theoretical data transfer throughputs of different RATs stored in the memory device according to yet another embodiment of the invention;

FIG. 4d shows exemplary theoretical data transfer throughputs of different RATs stored in the memory device according to still another embodiment of the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
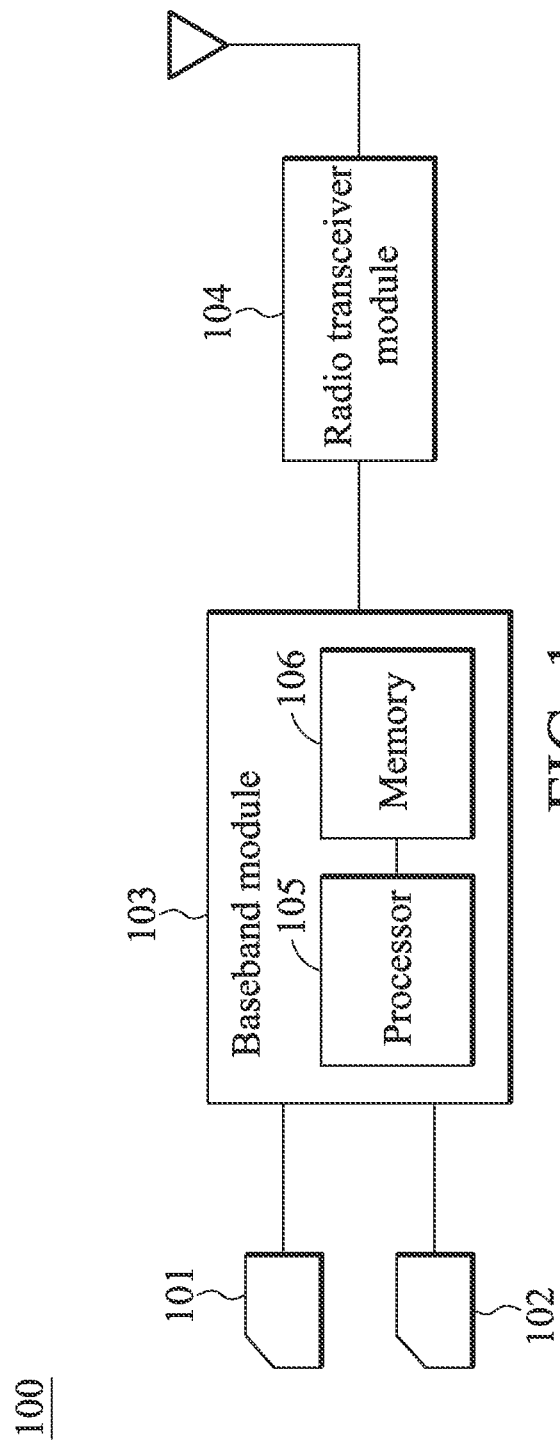
FIG. 1 shows a communication apparatus according to an embodiment of the invention.

FIG. 1 shows a communication apparatus according to an embodiment of the invention. As shown in FIG. 1, a communication apparatus 100 may comprise more than one subscriber identity card, such as the subscriber identity cards 101 and 102, as shown, a baseband module 103, and a radio transceiver module 104, wherein the baseband module 103 is coupled to the subscriber identity cards 101 and 102, and the radio transceiver module 104. The radio transceiver module 104 receives wireless radio frequency signals, converts the received signals to baseband signals to be processed by the baseband module 103, or receives baseband signals from the baseband module 103 and converts the received signals to wireless radio frequency signals to be transmitted to a peer device. The radio transceiver module 104 may comprise a plurality of hardware devices to perform radio frequency conversion. For example, the radio transceiver module 104 may comprise a mixer to multiply the baseband signals with a carrier oscillated in the radio frequency of the wireless communication system, wherein the radio frequency may be, for example, 900 MHz or 1800 MHz for a global system for mobile communication (GSM), or 1900 MHz for a Universal Mobile Telecommunications System (UMTS), or others. The baseband module 103 further converts the baseband signals to a plurality of digital signals, and processes the digital signals, and vice versa. The baseband module 103 may also comprise a plurality of hardware devices to perform baseband signal processing. The baseband signal processing may comprise analog to digital conversion (ADC)/digital to analog conversion (DAC), gain adjustment, modulation/demodulation, encoding/decoding, and so on. The baseband module 103 further comprises a memory device 106 and a processor 105 for controlling the operations of the baseband module 103, the radio transceiver module 104, and the subscriber identity cards 101 and 102 plugged into two sockets, respectively. The processor 105 reads data from the plugged subscriber identity cards 101 and 102 and writes data to the plugged subscriber identity cards 101 and 102. Note that the memory device 106 may also be configured outside of the baseband module 103 and the invention should not be limited thereto. Note also that FIG. 1 only shows one exemplary embodiment of the invention so as to simplify the description of the invention for a clearer understanding of the concepts the invention. Any wireless communications module that can provide wireless communications services may also be integrated within the invention and the invention should not be limited thereto. In addition, each module as previously described may be implemented as a single chip for providing corresponding functions, or may be integrated into a combo chip (i.e., a system on chip (SoC)), and the invention should not be limited thereto.

Figure 2:
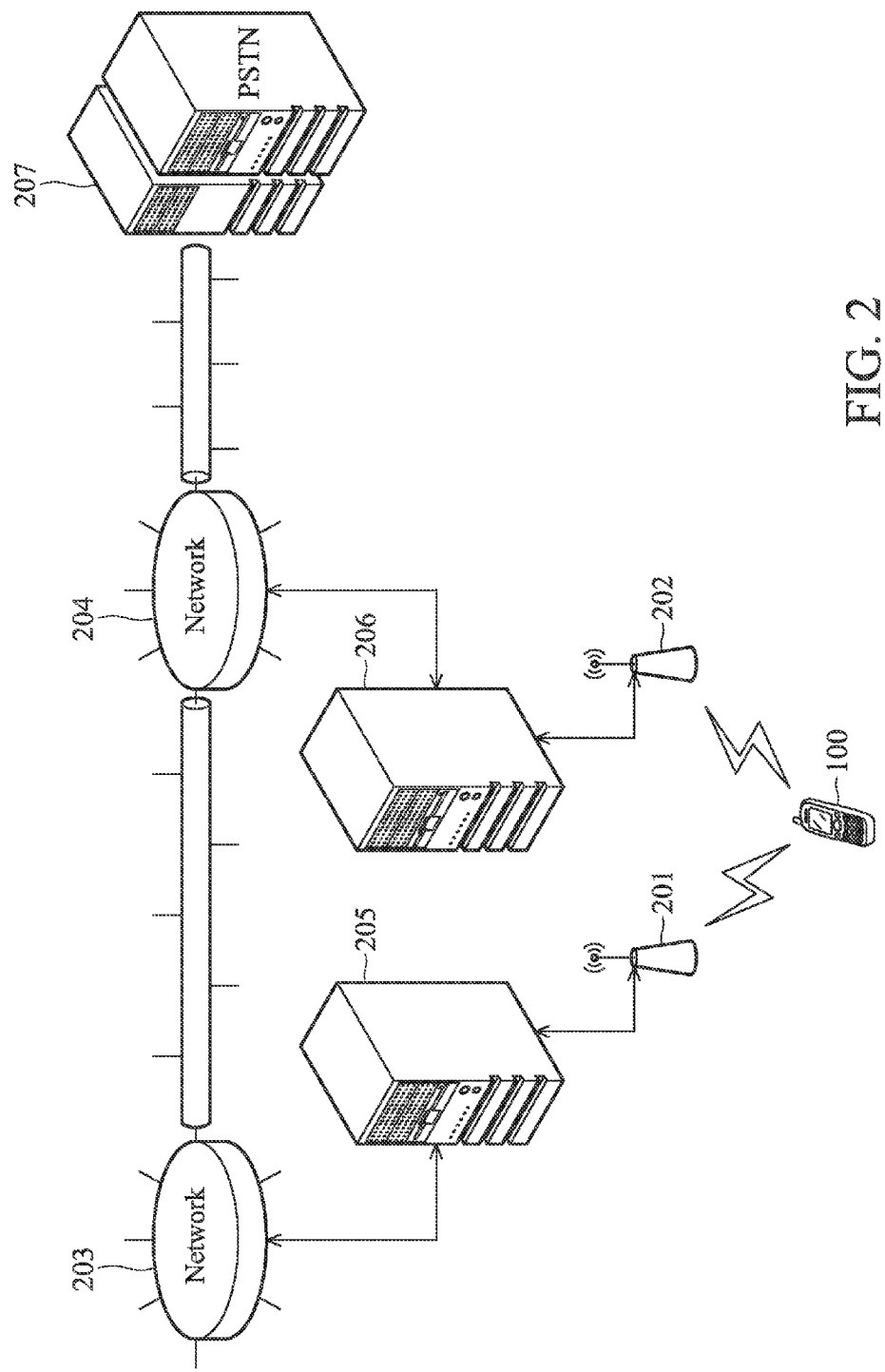
FIG. 2 shows an exemplary network topology according to an embodiment of the invention.

FIG. 2 shows an exemplary network topology according to an embodiment of the invention. The communication apparatus 100, equipped with more than one subscriber identity card, may simultaneously access more than one of the wireless networks 203 and 204 of the same or different radio access technologies (RATs), after camping on or associating with the cells managed by the access stations 201 and 202, where the access stations 201 or 202 may be a base station, a node-B, or an access point compatible with the 802.1a, 802.1b or 802.1g standards, or others. For example, the wireless network 203 and/or the wireless network 204 may be the GSM, WCDMA, Wi-Fi, CDMA2000 or Time Division-Synchronous Code Division Multiple Access (TD-SCDMA) network, or Internet, or the like. The communication apparatus 100 may issue an apparatus originated communication request, such as a voice call, a data call, a video call, or a voice over Internet Protocol (VOIP) call, to a called party (i.e. the corresponding peer of another wired or wireless communication apparatus) through at least one of the networks 203 and 204 with corresponding intermediary apparatuses 205 and 206 (for example, the GSM network with a Mobile Switching Center (MSC), the WCDMA/TD-SCDMA network with a Radio Network Controller (RNC), or the Internet with a Session Initiation Protocol (SIP) server), or through the Public Switched Telephone Network (PSTN) 207 or any combinations thereof, by using any of the equipped subscriber identity cards. Moreover, the communication apparatus 100 may receive an apparatus terminated communication request, also referred to as mobile terminated (MT) call request, such as an incoming phone call, with any of the subscriber identity cards from a calling party. It is to be understood that there may be one or more gateways positioned between heterogeneous types of networks.

According to an embodiment of the invention, the subscriber identity cards 101 and 102 may correspond to one type of wireless communications system. For example, the subscriber identity cards 101 or 102 may be the subscriber identity module (SIM) card corresponding to the GSM communications system, or the universal subscriber identity module (USIM) card corresponding to the UMTS communications system, or the removable user identity module (RUIM) card or the CDMA Subscriber Identity Module (CSIM) card corresponding to the CDMA2000 communication system, or others.

Figure 3:
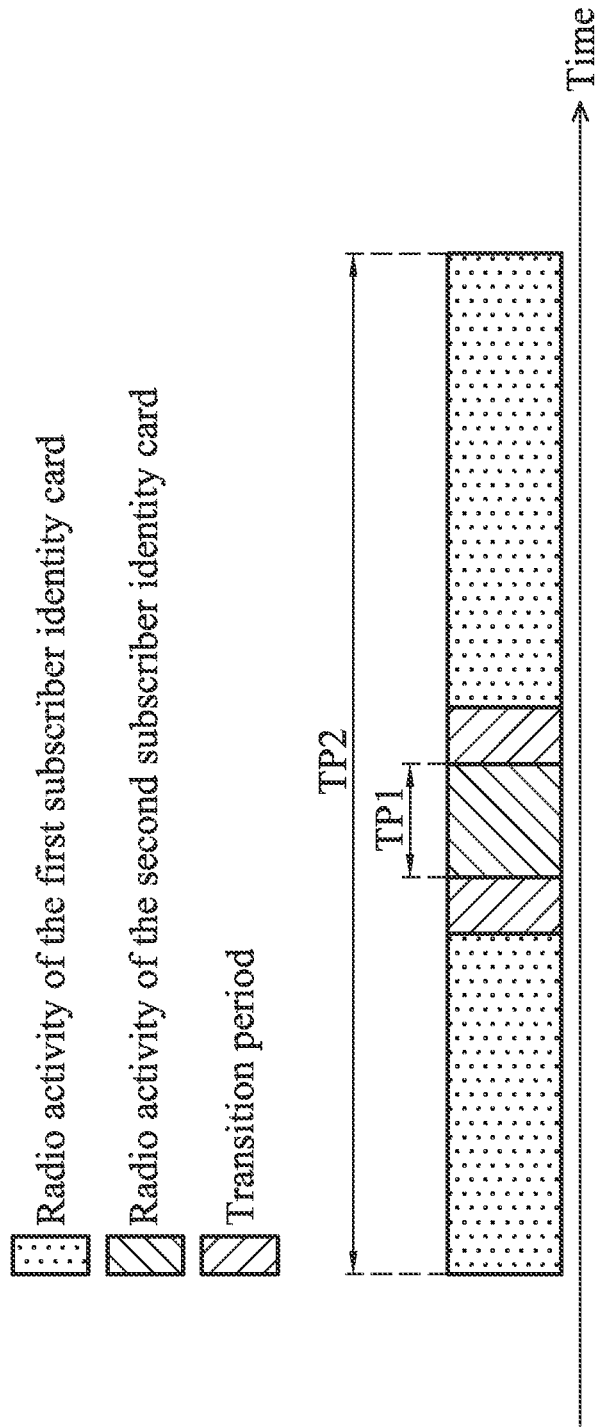
FIG. 3 shows an exemplary radio activity schedule of a radio transceiver module shared by multiple subscriber identity cards according to an embodiment of the invention.

FIG. 3 shows an exemplary radio activity schedule of a radio transceiver module shared by multiple subscriber identity cards according to an embodiment of the invention. In the embodiment, the radio transceiver module 104 is shared by the subscriber identity cards 101 and 102, and is switched to perform packet switch (PS) data transfer of the subscriber identity card 101 (hereinafter called the first subscriber identity card) during the time period TP1. However, within the time period TP1, a portion of time is punctured by the subscriber identity card 102 (hereinafter called the second subscriber identity card) so that the radio transceiver module 104 is switched to perform the radio activity of the second subscriber identity card. During the punctured time period TP2, the second subscriber identity card may perform any task that would be performed during an idle mode, such as listening to the broadcast channel, control channel, or paging indication channel or measuring signal qualities of serving or neighboring cells, or others, via the radio transceiver module 104. Note that in the conventional design, the second subscriber identity card may enter a "flight mode" to suspend its transmitting and receiving functions when the radio resource is occupied by the first subscriber identity card to perform CS voice or PS data transfer. However, based on the concept of the invention, the second subscriber identity card may enter a "virtual idle mode" when the radio transceiver module 104 is mainly occupied by the first subscriber identity card to perform PS data transfer (thus, the first subscriber identity card is in a packet transfer mode (PTM)), and does not have to suspend its transmitting and receiving functions. In the preferred embodiments, two protocol stacks may be implemented so as to respectively handle the radio activities of the first and second subscriber identity cards. However, it is also possible to implement only one protocol stack to handle the radio activities of the first and second subscriber identity cards at the same time, and the invention should not be limited thereto.

According to an embodiment of the invention, because the second subscriber identity card may enter a "virtual idle mode" while the first subscriber identity card is performing PS data transfer (i.e. in the packet transfer mode (PTM)), the second subscriber identity card may perform an inter-RAT change procedure to camp on an optimal cell (i.e. a cell associated with a more advanced RAT) by using the punctured time period. When the second subscriber identity card camps on an optimal cell, which may be judged by the processor 105 to have a higher data transfer throughput than the current RAT associated with the first identity card, the processor 105 may transfer the operation of the ongoing PS data transfer from the first subscriber identity card to the second subscriber identity card, so as to provide optimal PS data transfer for the communications apparatus user. This procedure may be called, inter subscriber identity card reselection.

According to an embodiment of the invention, a plurality of theoretical data transfer throughputs corresponding to different RATs may be stored in the memory device 106. FIG. 4a shows exemplary theoretical data transfer throughputs of different RATs stored in the memory device according to an embodiment of the invention. In this embodiment, the theoretical data transfer throughputs may be the maximum or minimum downlink throughput defined in the specifications associated with different RATs. For example, the minimum downlink throughput of different RATs, including the 2G/2.5G, 3G/3.5G and 4G RATs, is shown in FIG. 4a, where the throughput may be defined as the amount of data that can be transmitted per second (i.e. kbps). FIG. 4b shows exemplary theoretical data transfer throughputs of different RATs stored in the memory device according to another embodiment of the invention. In this embodiment, the experimental downlink throughputs of different RATs, which may be an averaged result obtained from several experiments (for example, Lab experiments, field tries, or others), are taken as the theoretical data transfer throughputs. FIG. 4c shows exemplary theoretical data transfer throughputs of different RATs stored in the memory device according to yet another embodiment of the invention. In this embodiment, the observed downlink throughputs of different RATs, which may be an averaged result obtained through previous practical experiences, are taken as the theoretical data transfer throughputs. FIG. 4d shows exemplary theoretical data transfer throughputs of different RATs stored in the memory device according to still another embodiment of the invention. In this embodiment, the expected downlink throughputs of different RATs, which may be obtained by taking an average of the maximum and minimum downlink throughputs defined by different RAT specifications, are taken as the theoretical data transfer throughputs. Note that the theoretical data transfer throughputs corresponding to different RATs with respect to different subscriber identity cards may also be respectively stored in the memory device 106. Further, the theoretical data transfer throughputs may also be obtained by ways other than what is shown in FIGS. 4a-4d, and therefore, the invention should not be limited thereto.

Figure 5:
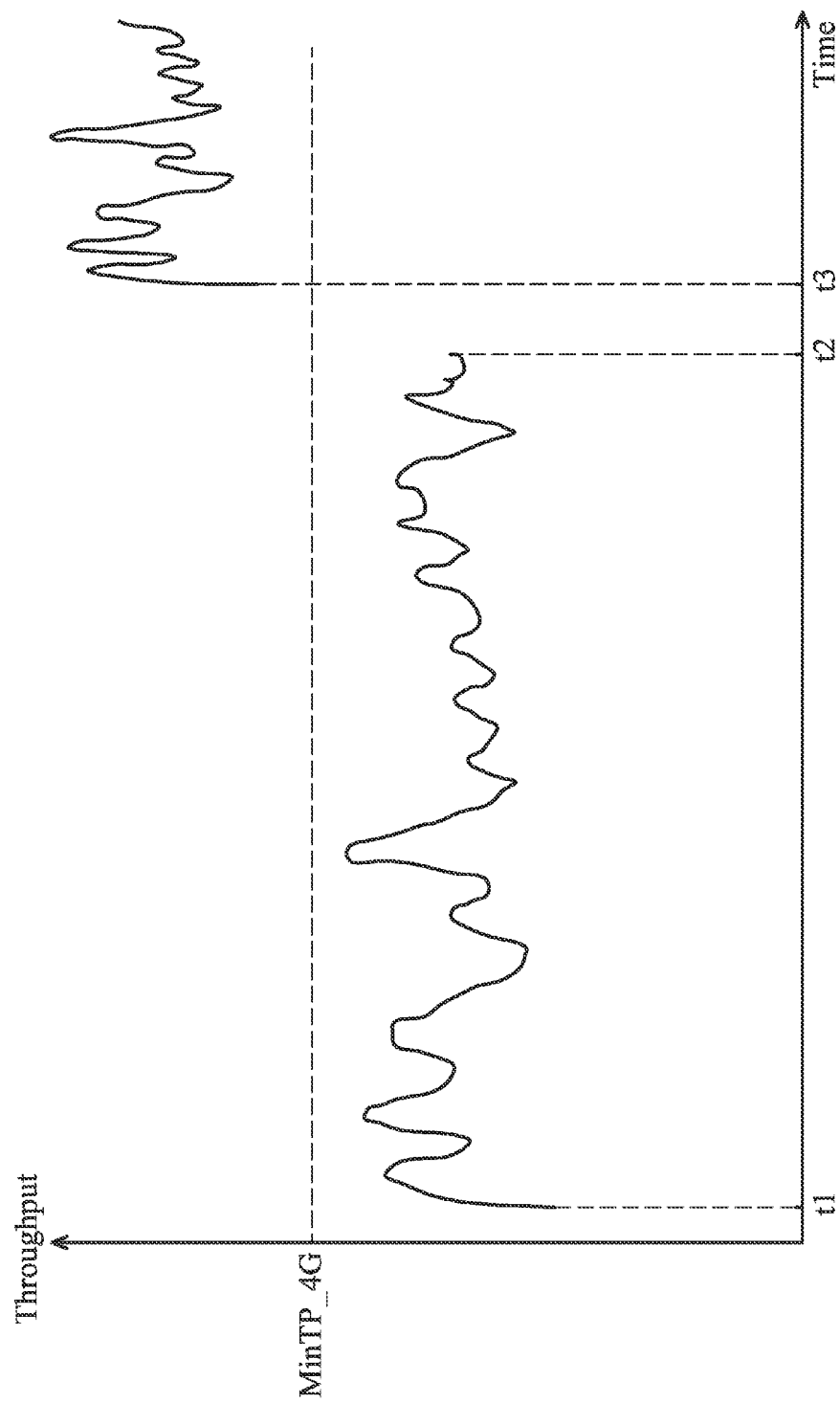
FIG. 5 shows an exemplary scenario of measured data transfer throughputs according to an embodiment of the invention.

As previously described, because the second subscriber identity card may enter a "virtual idle mode" when the first subscriber identity card is in the packet transfer mode (PTM), the processor 105 may obtain a theoretical data transfer throughput corresponding to the second RAT that is associated with the second cell camped on by the second subscriber identity card from the memory device 106, and determine to perform the data transfer in the second wireless network via the second subscriber identity card when the theoretical data transfer throughput corresponding to the second RAT is higher than a measured data transfer throughput corresponding to the first RAT associated with the first cell camped on by the first subscriber identity card. Note that the measurement of the data transfer throughput corresponding to the first RAT may be performed periodically or may be triggered by predetermined events. FIG. 5 shows an exemplary scenario of measured data transfer throughputs according to an embodiment of the invention. In the embodiment, the processor 105 may begin to construct a first packet switch connection with a first wireless network, which is a 2G network, via the first subscriber identity card to perform the PS data transfer in the first wireless network from time t1. When performing the PS data transfer, the processor 105 may further measure the data transfer throughputs of the first wireless network to obtain data which is shown as a curve of measured data transfer throughputs as shown in FIG. 5. At the same time, the second subscriber identity card may enter the virtual idle mode and keep performing its transmitting and receiving schedules in the punctured time. Suppose that the second subscriber identity card has camped on the second cell, which may be a 4G cell, at time t2, the processor 105 may obtain a theoretical 4G data transfer throughput from the memory device 106, for example, a minimum downlink throughput MinTP_4G defined by the specification as shown, and compare the obtained theoretical 4G data transfer throughput with a first practical data transfer throughput corresponding to the ongoing PS data transfer. The first practical data transfer throughput may be obtained by an averaged result of the measured data transfer throughputs obtained over a period of time, a maximum/minimum value of the obtained measured data transfer throughputs, or other.

When the theoretical 4G data transfer throughput is higher than the first practical data transfer throughput corresponding to the ongoing PS data transfer, the processor 105 may determine to perform the PS data transfer in the second wireless network via the second subscriber identity card. For example, in one embodiment, the processor 105 may suspend the ongoing PS data transfer in the first wireless network, disconnect the first packet switch connection with the first wireless network, construct a second packet switch connection with the second wireless network via the second subscriber identity card, and resume the PS data transfer in the second wireless network. As shown in FIG. 5, the processor 105 may suspend the ongoing PS data transfer in the first wireless network and disconnect the first packet switch connection with the first wireless network at time t2, and start to construct a second packet switch connection with the second wireless network via the second subscriber identity card and resume the PS data transfer in the second wireless network at time t3. The time gap from the time t2 to t3 is the transition time required due to the switching of the radio transceiver module 104. Because the 4G network has a theoretical data transfer throughput which is higher than that of the first practical data transfer throughput of the 2G network, it is highly possible to improve the data transfer throughput at time t3.

According to an embodiment of the invention, the processor 105 may obtain a theoretical data transfer throughput of the RAT corresponding to the subscriber identity card in the virtual idle mode and compare the theoretical data transfer throughput with the first practical data transfer throughput when the subscriber identity card in the virtual idle mode has camp on a cell. For example, the radio transceiver module 104 may be switched to perform a camp on procedure to facilitate the subscriber identity card in the virtual idle mode to camp on a cell when the other subscriber identity card is in the packet transfer mode (PTM). As defined by the TS43.022 (2G) specification, being camped on a cell means that the mobile station (MS) has completed a cell selection/reselection process and has chosen a cell from which it plans to receive all available services. For normal services, normal camping means that the MS has to camp on a suitable cell, and tune to that cell's control channel(s). In addition, as defined by the TS 25.304 (3G) specification, being camped on a cell means that the user equipment (UE) has completed the cell selection/reselection process and has chosen a cell. The UE monitors system information and (in most cases) paging information. In addition, the UE searches for a suitable cell of the selected public land mobile network (PLMN) and chooses that cell to provide available services, and tunes to its control channel. The choosing is known as "camping on a cell". Note that a person with ordinary skill in the art will readily appreciate or deduce that the definition of camping on a cell may apply to other developed or to be developed RATs. Thus, the definitions described in the specification corresponding to other RATS are omitted here for brevity.

According to another embodiment of the invention, the processor 105 may also obtain a theoretical data transfer throughput of the RAT corresponding to the subscriber identity card in the virtual idle mode and compare the theoretical data transfer throughput with the first practical data transfer throughput when the subscriber identity card in the virtual idle mode has changed its RAT. For example, the radio transceiver module 104 may be switched to perform an inter-RAT change procedure to facilitate the subscriber identity card in the virtual idle mode to camp on a cell associated with a different RAT during a period of performing data transfer via the other subscriber identity card that is in the packet transfer mode (PTM). The scenarios that can cause changes in RATs may include, but are not limited to, inter-RAT selection, inter-RAT reselection, cell change order, or others. As defined by the 3GPP 45.008 6.6.5/6.6.6 specification, the MS shall then reselect a suitable (see the specification 3GPP TS 25.304) Universal Terrestrial Radio Access Network (UTRAN) cell if: for a Time-division duplex (TDD) cell, the measured received signal code power (RSCP) value is equal to or greater than TDD_Qoffset for a period of 5 s, and, for a Frequency-division duplex (FDD) cell, the following criteria are all met for a period of 5 seconds, including 1) its measured RSCP value exceeds the value of RLA_C for the serving cell and all of the suitable (see the specification 3GPP TS 43.022) non-serving GSM cells by the value FDD_Qoffset, 2) its measured Ec/No value is equal or greater than the value (FDD_Qmin−FDD_Qmin_Offset), and 3) its measured RSCP value is equal to or greater than FDD_RSCP_threshold.

As defined by the 3GPP 25.304 5.2.2.1 specification, whenever a PLMN has been selected by Non Access Stratum (NAS), the UE shall attempt to find a suitable cell to camp on. The NAS may control the cell selection by: 1) providing information on RAT(s) associated with the selected PLMN, 2) maintaining lists of forbidden registration areas; and 3) providing a list of equivalent PLMNs. As defined by the 3GPP 25.331 8.3.10.1 specification, the purpose of the inter-RAT cell change order to UTRAN procedure is to transfer, under the control of the source, radio access technology, a connection between the UE and another radio access technology (e.g. GSM/GPRS) to UTRAN. Note that the person of ordinary skill in the art will readily appreciate or deduce the definition of camped on a cell in other developed or to be developed RATs, and for the definitions described in the specifications corresponding to other RATS are omitted here for brevity.

Referring back to FIG. 5, according to an embodiment of the invention, before the first packet switch connection is disconnected, the processor 105 may further record the first practical data transfer throughput which corresponds to the first RAT measured during the time period from t1 to t2, and store the recorded first practical data transfer throughput in the memory device 106 as an expected data transfer throughput. After the processor 105 determines to perform PS data transfer in the second wireless network via the second subscriber identity card, the processor 105 may also measure and monitor a throughput of the second wireless network during a period of performing the data transfer via the second subscriber identity card over a predetermined time period, so as to obtain a second practical data transfer throughput and compare the second practical data transfer throughput with the expected data transfer throughput. Note that the measurement of the data transfer throughput corresponding to the second wireless network may be performed periodically or may be triggered by predetermined events. When the expected data transfer throughput is higher than the second data transfer throughput, the processor 105 may determine to transfer the data transfer procedure back to the first subscriber identity card.

Figure 6:
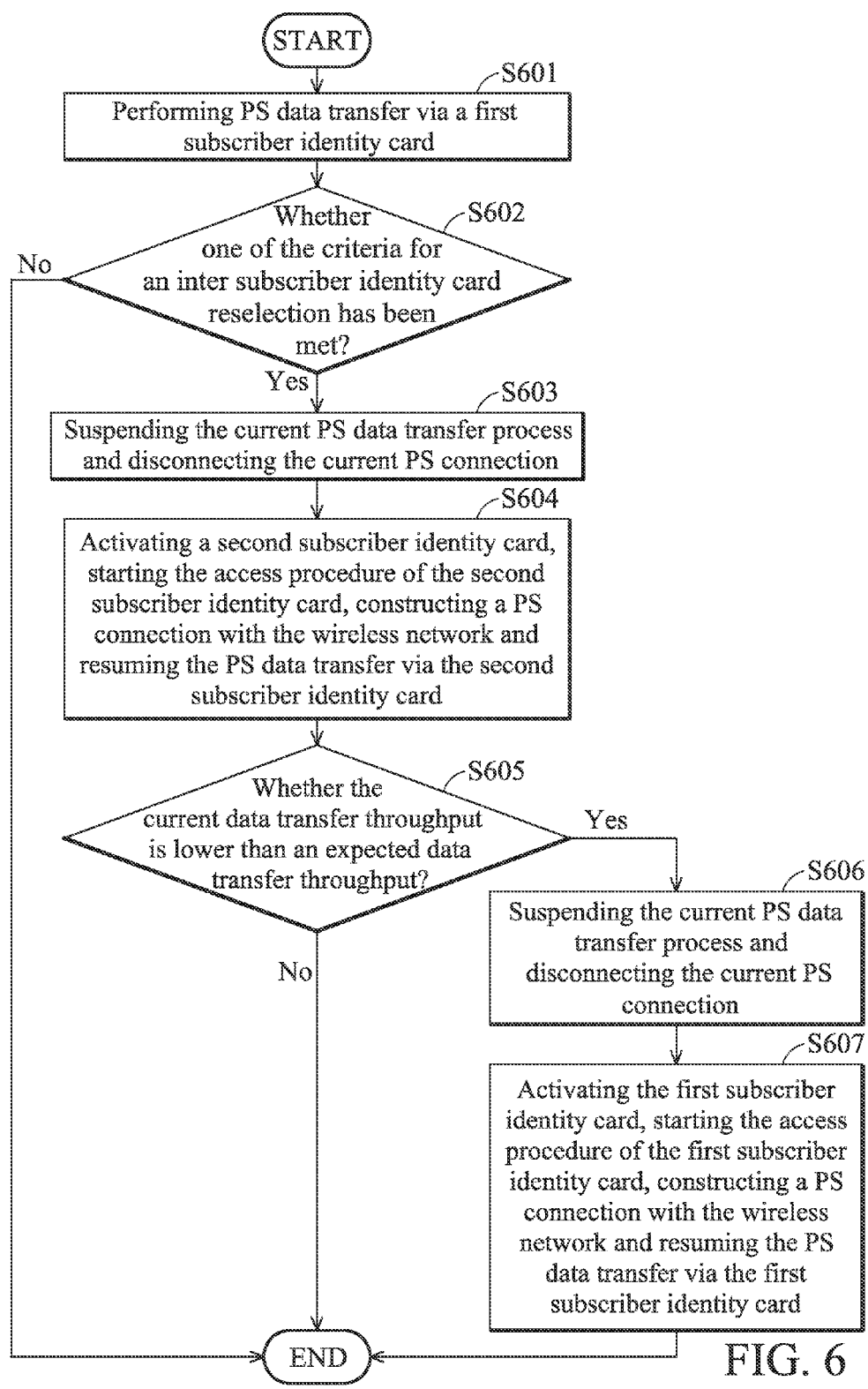
FIG. 6 is flow chart of a method for selecting a subscriber identity card having an optimal RAT to perform data transfer according to an embodiment of the invention.

FIG. 6 is flow chart of a method for selecting a subscriber identity card having an optimal RAT to perform data transfer according to an embodiment of the invention. When performing PS data transfer via a first subscriber identity card (Step S601), the processor 105 may check whether one of the criteria for an inter subscriber identity card reselection has been met (Step S602). According to the embodiments of the invention, the criteria may be, for example, a second subscriber identity card in the virtual idle mode is camped on a cell associated with a RAT that is more advanced than the RAT currently being used for transferring the PS data, or a second subscriber identity card in the virtual idle mode has changed its RAT to a more advanced one than the one currently being used for transferring the PS data, or a second subscriber identity card in the virtual idle mode can support a RAT that is more advanced than the one currently being used for transferring the PS data, or others. Note that in the embodiments, the term "more advanced" means a higher supported data transfer throughput. When one of the criteria for the inter subscriber identity card reselection has met, the processor 105 may suspend the current PS data transfer process and disconnect the current PS connection (Step S603). Next, the processor 105 may activate the second subscriber identity card, which is in the virtual idle mode and has met the inter subscriber identity card reselection criteria, and then start the access procedure of the second subscriber identity card, construct a PS connection with the wireless network and resume the PS data transfer via the second subscriber identity card (Step S604).

After the PS data transfer process is performed via the second subscriber identity card, the processor 105 may further check whether the current data transfer throughput is lower than an expected data transfer throughput (Step S605). As previously described, the processor 105 may record the data transfer throughput measured before the PS connection of the first subscriber identity card is disconnected as the expected data transfer throughput. When the current data transfer throughput is lower than the expected data transfer throughput, the processor 105 may determine to transfer the PS data transfer process back to the first subscriber identity card. Similarly, the processor 105 may suspend the current PS data transfer process and disconnect the current PS connection (Step S606), and further activate the first subscriber identity card, and then start the access procedure of the first subscriber identity card, construct a PS connection with the wireless network and resume the PS data transfer via the first subscriber identity card (Step S607).

Figure 7:
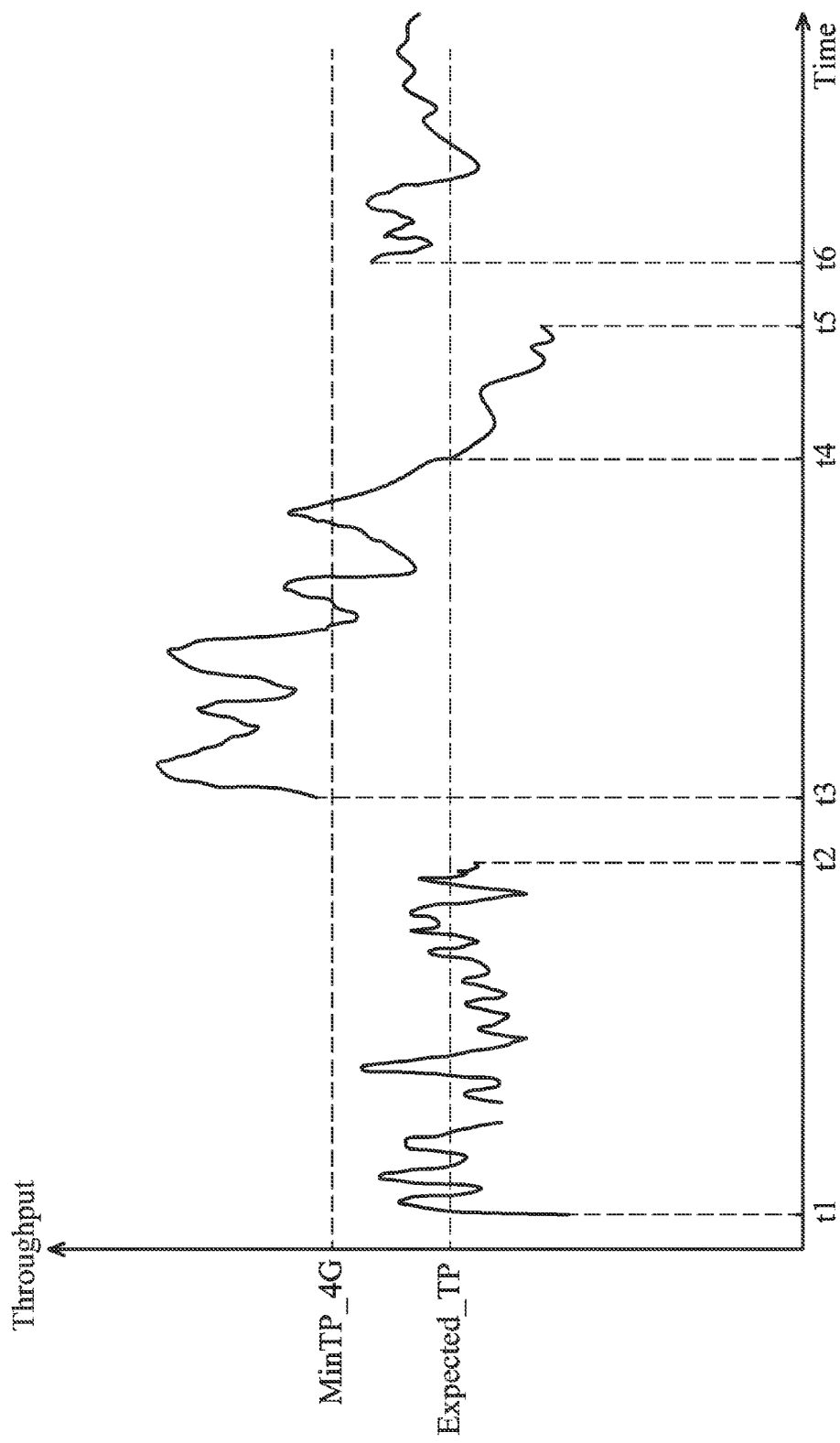
FIG. 7 shows an exemplary scenario of measured data transfer throughputs according to another embodiment of the invention.

FIG. 7 shows an exemplary scenario of measured data transfer throughputs according to another embodiment of the invention. The scenario beginning from time t1 to t3 as shown in FIG. 7 is the same as the scenario shown in FIG. 5. In other words, during the time period from time t1 to t2, the PS data transfer process is performed on the first subscriber identity card, and after the time t3, the PS data transfer process is performed on the second subscriber identity card. However, from time t4, the data transfer throughput dramatically drops, and the processor 105 determines that the current data transfer throughput is lower than the expected data transfer throughput Expected_TP. Because the current data transfer throughput is lower than the expected data transfer throughput Expected_TP, the processor 105 may determine to transfer the PS data transfer process back to the first subscriber identity card at time t5. Therefore, from the time t6, the PS data transfer process is performed on the first subscriber identity card.

According to another embodiment of the invention, when the current data transfer throughput is lower than the expected data transfer throughput, the processor 105 may further record an identifier corresponding to the cell having the current data transfer throughput lower than the expected data transfer throughput in a black list. According to an embodiment of the invention, the identifier corresponding to the cell may be the cell identity of that cell. The black list may be stored in the memory device 106 as another criteria to determine whether the inter subscriber identity card reselection should be performed. For example, the inter subscriber identity card reselection should be performed when the subscriber identity card in the virtual idle mode is camped on a cell associated with a RAT that is more advanced than the RAT currently being used for transferring the PS data, and the cell associated with the more advanced RAT is not in the black list. For another example, the inter subscriber identity card reselection should be performed when the subscriber identity card in the virtual idle mode has changed its RAT to a more advanced one than the one currently being used for transferring the PS data, and the cell associated with the more advanced RAT is not in the black list. For yet another example, the inter subscriber identity card reselection should be performed when the subscriber identity card in the virtual idle mode can support a RAT that is more advanced than the one currently being used for transferring the PS data, and the cell associated with the more advanced RAT is not in the black list.

Figure 8:
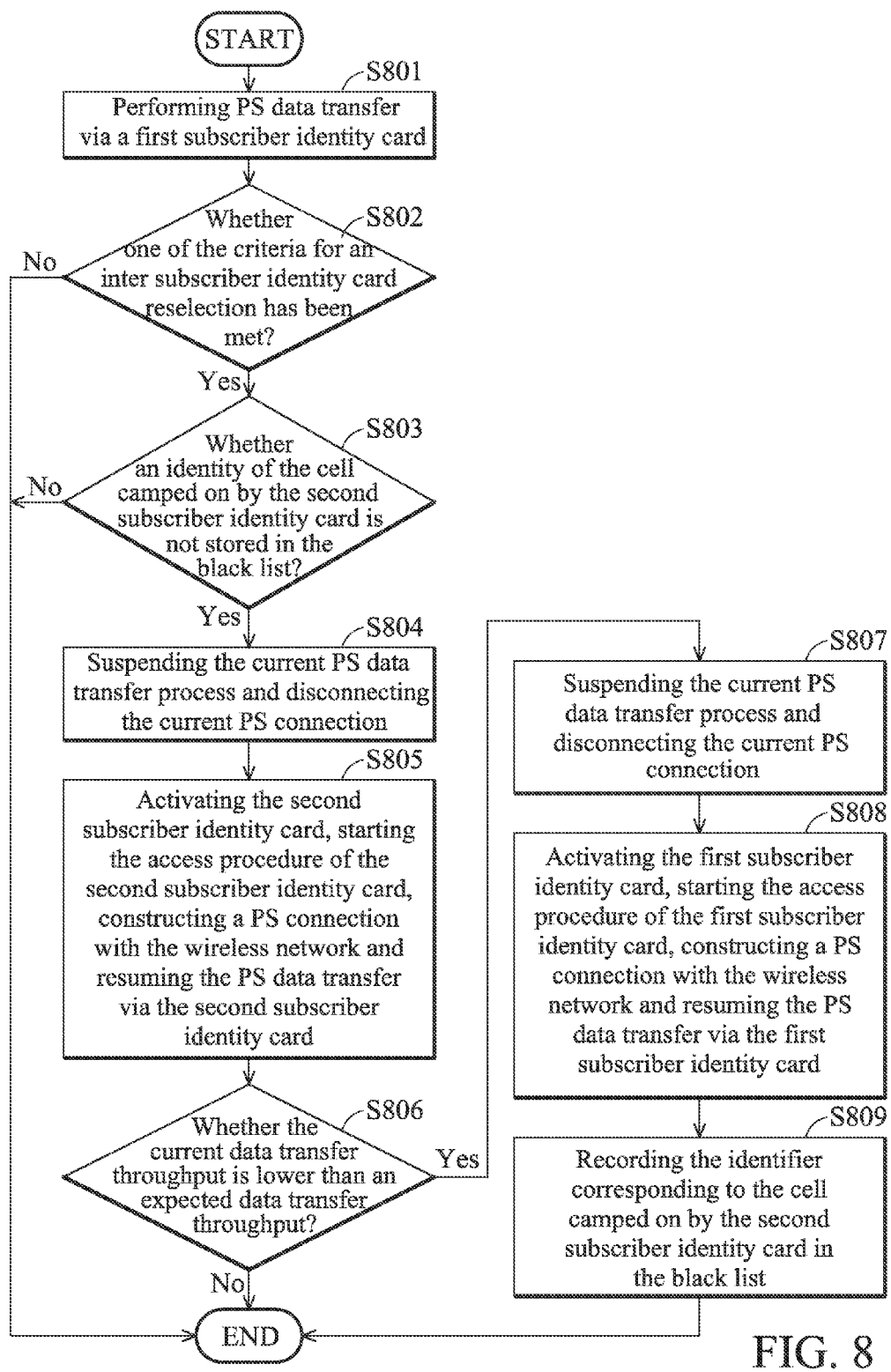
FIG. 8 is flow chart of a method for selecting a subscriber identity card having an optimal RAT to perform data transfer according to another embodiment of the invention.

FIG. 8 is flow chart of a method for selecting a subscriber identity card having an optimal RAT to perform data transfer according to an embodiment of the invention. In this embodiment, when performing PS data transfer via a first subscriber identity card (Step S801), the processor 105 may check whether one of the criteria for an inter subscriber identity card reselection has been met (Step S802). As previously described, the criteria may be, for example, a second subscriber identity card in the virtual idle mode has camped on a cell associated with a RAT that is more advanced than the RAT currently being used for transferring the PS data, or a second subscriber identity card in the virtual idle mode has changed its RAT to a more advanced one than the one currently being used for transferring the PS data, or a second subscriber identity card in the virtual idle mode can support a RAT that is more advanced than the one currently being used for transferring the PS data, or others. When the criteria for the inter subscriber identity card reselection has been met, the processor 105 may further determine whether an identity of the cell camped on by the second subscriber identity card is not stored in the black list (Step S803). When the identity of the cell camped on by the second subscriber identity card is not stored in the black list, the processor 105 may begin the inter subscriber identity card reselection process to suspend the current PS data transfer process and disconnect the current PS connection (Step S804). Next, the processor 105 may activate the second subscriber identity card, which is in the virtual idle mode and has met the inter subscriber identity card reselection criteria, and then start the access procedure of the second subscriber identity card, construct a PS connection with the wireless network and resume the PS data transfer via the second subscriber identity card (Step S805).

After the PS data transfer process is performed via the second subscriber identity card, the processor 105 may further check whether the current data transfer throughput is lower than an expected data transfer throughput (Step S806). As previously described, the processor 105 may record the data transfer throughput measured before disconnecting the current PS connection of the first subscriber identity card as the expected data transfer throughput. When the current data transfer throughput is lower than the expected data transfer throughput, the processor 105 may determine to transfer the PS data transfer process back to the first subscriber identity card. Similarly, the processor 105 may suspend the current PS data transfer process and disconnect the current PS connection (Step S807), and further activate the first subscriber identity card, and then start the access procedure of the first subscriber identity card, construct a PS connection with the wireless network and resume the PS data transfer via the first subscriber identity card (Step S808). In addition, the processor 105 may further record the identifier corresponding to the cell camped on by the second subscriber identity card in the black list for future use (Step S809). Note that in some embodiments of the invention, the recorded identifier may be removed from the black list after a predetermined time period.

According to another embodiment of the invention, the concept of selecting a subscriber identity card having an optimal RAT may also be applied when constructing a PS connection. For example, according to an embodiment of the invention, for the dual subscriber identity card example as shown in FIG. 1, the processor 105 may obtain a first theoretical data transfer throughput corresponding to a first RAT associated with a first cell camped on by a first subscriber identity card and a second theoretical data transfer throughput corresponding to a second RAT associated with a second cell camped on by a second subscriber identity card from the memory device 106, and begin to construct the PS connection with the wireless network via the subscriber identity card having the higher theoretical data transfer throughput. In addition, when the first theoretical data transfer throughput is the same as the second theoretical data transfer throughput, the processor 105 may further obtain a third theoretical data transfer throughput corresponding to the most advanced RAT supported by the first subscriber identity card and a fourth theoretical data transfer throughput corresponding to the most advanced RAT supported by the second subscriber identity card, and begin to construct the PS connection with the wireless network via the subscriber identity card having the higher theoretical data transfer throughput.

For example, supposed that the RATs supported by the first subscriber identity card are 2G and 3G RATs, and the RATs supported by the second subscriber identity card are 2G, 3G and 4G RATs. When the first subscriber identity card has camped on a 3G cell and the second subscriber identity card has camped on a 2G cell, the theoretical data transfer throughput corresponding to the 3G cell is generally higher than that of the 2G cell. Therefore, the processor 105 may select to perform PS data transfer via the first subscriber identity card. For another example, when both the first subscriber identity card and the second subscriber identity card have camped on 2G cells, the theoretical data transfer throughputs corresponding to the 2G cells may be the same. Therefore, the processor 105 may select to perform PS data transfer via the second subscriber identity card because the most advanced RAT supported by the second subscriber identity card is 4G, which is supposed to have a higher theoretical data transfer throughput than the 3G RAT (the most advanced RAT supported by the first subscriber identity card). Note that in some embodiments of the invention, since different RATs may use different transmission bands, the RAT associated with the currently camped on cell may be obtained according to the frequency of the transmission bands. Note also that in other embodiments of the invention, information regarding the most advanced RAT that can be supported by the subscriber identity card may be obtained from the corresponding subscriber identity card (such as the related Elementary File (EF) stored in the SIM, the USIM, the RUIM, or the likes), or obtained according to hardware or software configurations of the communications apparatus, or obtained from the operators of the wireless networks, or any combinations thereof.

Figure 9:
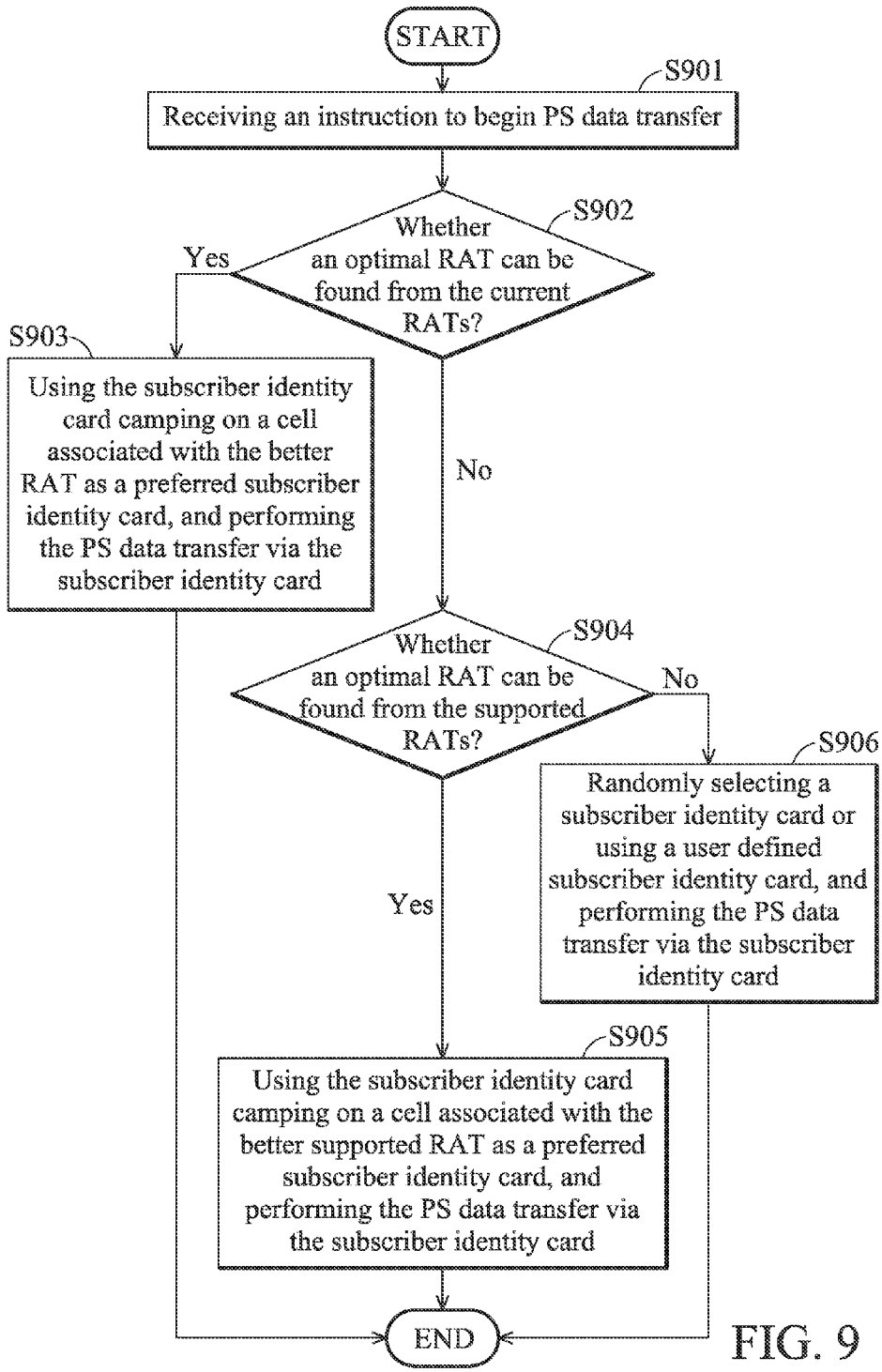
FIG. 9 is flow chart of a method for selecting a subscriber identity card having an optimal RAT to perform data transfer according to yet another embodiment of the invention.

FIG. 9 is flow chart of a method for selecting a subscriber identity card having an optimal RAT to perform data transfer according to yet another embodiment of the invention. After receiving an instruction to begin PS data transfer (Step S901), the processor 105 may first determine whether an optimal RAT can be found from the current RATs associated with the cells currently camped on by different subscriber identity cards (Step S902). When an optimal RAT can be found from the current RATs, for example, a current RAT having a higher theoretical data transfer throughput than other RATs can be found, the processor 105 may use the subscriber identity card camping on a cell associated with the optimal RAT as a preferred subscriber identity card, and perform the PS data transfer via the subscriber identity card (Step S903). When an optimal RAT can not be found from the current RATs, for example, when the current RATs associated with the cells currently camped on by different subscriber identity cards are the same or have the same theoretical data transfer throughputs, the processor 105 may further determine whether an optimal RAT can be found from the supported RATs corresponding to different subscriber identity cards (Step S904). When an optimal RAT can be found from supported RATs, for example, when the most advanced RAT that can be supported by a subscriber identity card has a higher theoretical data transfer throughput than other RATs, the processor 105 may use the subscriber identity card camping on a cell associated with the optimal supported RAT as a preferred subscriber identity card, and perform the PS data transfer via the subscriber identity card (Step S905). On the other hand, when an optimal supported RAT can not be found, the processor 105 may randomly select a subscriber identity card, or use a user defined subscriber identity card, and perform the PS data transfer via the subscriber identity card (Step S906).

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general purpose hardware that is programmed using microcode or software to perform the functions recited above.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
a processor, coupled to a first subscriber identity card, a second subscriber identity card, a memory device and a radio transceiver module,
wherein the first subscriber identity card camps on a first cell, which is associated with a first radio access technology (RAT) and belongs to a first wireless network, via the radio transceiver module;
wherein the second subscriber identity card camps on a second cell, which is associated with a second RAT and belongs to a second wireless network, via the radio transceiver module;
wherein the memory device stores a plurality of theoretical data transfer throughputs corresponding to different RATs; and
wherein the processor constructs a first packet switch connection with the first wireless network via the first subscriber identity card to perform data transfer in the first wireless network, measures a first data transfer throughput of the first wireless network when performing the data transfer via the first subscriber identity card, obtains a theoretical data transfer throughput corresponding to the second RAT from the memory device, and determines to perform the data transfer in the second wireless network via the second subscriber identity card when the theoretical data transfer throughput corresponding to the second RAT of the second wireless network is higher than the first data transfer throughput of the first wireless network measured by the processor.

2. The communication apparatus as claimed in claim 1, wherein the processor further suspends the data transfer in the first wireless network, disconnects the first packet switch connection with the first wireless network, constructs a second packet switch connection with the second wireless network via the second subscriber identity card, and resumes the data transfer in the second wireless network.

3. The communication apparatus as claimed in claim 1, wherein the radio transceiver module is switched to perform a camp on procedure of the second subscriber identity card to facilitate the second subscriber identity card to camp on the second cell during a period of performing the data transfer via the first subscriber identity card.

4. The communication apparatus as claimed in claim 1, wherein the radio transceiver module is switched to perform an inter-RAT change procedure of the second subscriber identity card to facilitate the second subscriber identity card to camp on the second cell during a period of performing the data transfer via the first subscriber identity card.

5. The communication apparatus as claimed in claim 2, wherein the processor further records the first data transfer throughput measured before the first packet switch connection is disconnected in the memory device.

6. The communication apparatus as claimed in claim 5, wherein the processor further measures and monitors a throughput of the second wireless network when performing the data transfer via the second subscriber identity card over a predetermined time period to obtain a second data transfer throughput, and compares the second data transfer throughput with the recorded first data transfer throughput, and determines to perform the data transfer in the first wireless network via the first subscriber identity card when the recorded first data transfer throughput is higher than the second data transfer throughput.

7. The communication apparatus as claimed in claim 6, wherein the processor further suspends the data transfer in the second wireless network, disconnects the second packet switch connection with the second wireless network, constructs a third packet switch connection with the first wireless network via the first subscriber identity card, and resumes the data transfer in the first wireless network.

8. The communication apparatus as claimed in claim 6, wherein the processor further records an identifier corresponding to the second cell in a black list when the recorded first data transfer throughput is higher than the second data transfer throughput.

9. The communication apparatus as claimed in claim 1, wherein the processor further checks whether an identifier corresponding to the second cell is in a black list and determines to perform the data transfer in the second wireless network via the second subscriber identity card when the identifier corresponding to the second cell is not in the black list.

10. The communication apparatus as claimed in claim 1, wherein before performing the data transfer, the processor further obtains a first theoretical data transfer throughput corresponding to the first RAT and a second theoretical data transfer throughput corresponding to the second RAT from the memory device, and begins to construct the first packet switch connection with the first wireless network via the first subscriber identity card to perform the data transfer in the first wireless network when the first theoretical data transfer throughput is higher than the second theoretical data transfer throughput.

11. The communication apparatus as claimed in claim 1, wherein before performing the data transfer, the processor further obtains a first theoretical data transfer throughput corresponding to a most advanced RAT supported by the first subscriber identity card and a second theoretical data transfer throughput corresponding to a most advanced RAT supported by the second subscriber identity card from the memory device, and begins to construct the first packet switch connection with the first wireless network via the first subscriber identity card to perform the data transfer in the first wireless network when the first theoretical data transfer throughput is higher than the second theoretical data transfer throughput.

12. A method for selecting a subscriber identity card of a communications apparatus having an optimal radio access technology (RAT) to perform data transfer, comprising:
measuring a first data transfer throughput corresponding to a first RAT and obtaining a second theoretical data transfer throughput corresponding to a second RAT, wherein a first subscriber identity card is equipped in the communications apparatus and camps on a first cell, which is associated with the first RAT and belongs to a first wireless network, and a second subscriber identity card is equipped in the communications apparatus and camps on a second cell, which is associated with the second RAT and belongs to a second wireless network and a radio transceiver module;
constructing a first packet switch connection with the first wireless network via the first subscriber identity card to perform data transfer when the measured first data transfer throughput corresponding to the first RAT is higher than the second theoretical data transfer throughput corresponding to the second RAT; and
performing the data transfer in the first wireless network via the first subscriber identity card.

13. The method as claimed in claim 12, further comprising:
obtaining a third theoretical data transfer throughput corresponding to a most advanced RAT supported by the first subscriber identity card and a fourth theoretical data transfer throughput corresponding to a most advanced RAT supported by the second subscriber identity card when the first RAT is the same as the second RAT;
constructing the first packet switch connection with the first wireless network via the first subscriber identity card when the third theoretical data transfer throughput is higher than the fourth theoretical data transfer throughput; and
performing the data transfer in the first wireless network via the first subscriber identity card.

14. The method as claimed in claim 12, further comprising:
measuring a first practical data transfer throughput of the first wireless network when performing the data transfer via the first subscriber identity card;
comparing the first practical data transfer throughput with the second theoretical data transfer throughput; and
performing the data transfer in the second wireless network via the second subscriber identity card when the second theoretical data transfer throughput is higher than the first practical data transfer throughput.

15. The method as claimed in claim 14, further comprising:
suspending the data transfer in the first wireless network;
disconnecting the first packet switch connection with the first wireless network;
constructing a second packet switch connection with the second wireless network via the second subscriber identity card; and
resuming the data transfer in the second wireless network.

16. The method as claimed in claim 13, further comprising:
suspending the data transfer in the first wireless network when performing the data transfer via the first subscriber identity card;

switching the radio transceiver module to perform a camp on procedure of the second subscriber identity card to facilitate the second subscriber identity card to camp on a third cell associated with a third RAT; and obtaining a fifth theoretical data transfer throughput corresponding to the third RAT and comparing the first practical data transfer throughput with the fifth theoretical data transfer throughput after the second subscriber identity card has camped on the third cell.

17. The method as claimed in claim 13, further comprising:
suspending the data transfer in the first wireless network when performing the data transfer via the first subscriber identity card;

switching the radio transceiver module to perform an inter-RAT change procedure of the second subscriber identity card to facilitate the second subscriber identity card to camp on a third cell associated with a third RAT; and obtaining a fifth theoretical data transfer throughput corresponding to the third RAT and comparing the first practical data transfer throughput with the fifth theoretical data transfer throughput after the second subscriber identity card has camped on the third cell.

18. The method as claimed in claim 15, further comprising:
recording the first practical data transfer throughput measured before the first packet switch connection is disconnected in a memory device.

19. The method as claimed in claim 18, further comprising:
measuring and monitoring a throughput of the second wireless network when performing the data transfer via the second subscriber identity card over a predetermined time period to obtain a second practical data transfer throughput;

comparing the second practical data transfer throughput with the recorded first practical data transfer throughput; and performing the data transfer in the first wireless network via the first subscriber identity card when the recorded first practical data transfer throughput is higher than the second practical data transfer throughput.

20. The method as claimed in claim 19, further comprising:
recording an identifier corresponding to the second cell in a black list stored in the memory device when the recorded first practical data transfer throughput is higher than the second practical data transfer throughput.

21. The method as claimed in claim 14, further comprising:
checking whether an identifier corresponding to the second cell is in a black list; and performing the data transfer in the second wireless network via the second subscriber identity card when the identifier corresponding to the second cell is not in the black list.

* * * * *